United States Patent
Lam

(10) Patent No.: US 12,153,910 B2
(45) Date of Patent: Nov. 26, 2024

(54) GOLDEN FLASH IMAGE

(71) Applicant: BAE Systems Information and Electronic Systems Integration Inc., Nashua, NH (US)

(72) Inventor: Mei I. Lam, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 86 days.

(21) Appl. No.: 18/055,513

(22) Filed: Nov. 15, 2022

(65) Prior Publication Data
US 2024/0160426 A1 May 16, 2024

(51) Int. Cl.
| | |
|---|---|
| G06F 11/14 | (2006.01) |
| G06F 8/61 | (2018.01) |
| G06F 9/24 | (2006.01) |
| G06F 9/44 | (2018.01) |
| G06F 11/10 | (2006.01) |
| G06F 21/57 | (2013.01) |
| G06F 8/65 | (2018.01) |
| G06F 9/4401 | (2018.01) |

(52) U.S. Cl.
CPC .............. *G06F 8/63* (2013.01); *G06F 8/66* (2013.01); *G06F 9/4401* (2013.01); *G06F 9/4406* (2013.01); *G06F 9/4408* (2013.01); *G06F 11/1417* (2013.01); *G06F 21/575* (2013.01)

(58) Field of Classification Search
CPC .......... G06F 8/63; G06F 8/66; G06F 11/1417; G06F 21/575
See application file for complete search history.

(56) References Cited

U.S. PATENT DOCUMENTS 10,839,081 B2 * 11/2020 Zarakas ................ G06F 21/86
2011/0131447 A1 * 6/2011 Prakash ............... G06F 9/4408
713/189

(Continued)

OTHER PUBLICATIONS

Nekija Dzemaili, A reliable booting system for Zynq Ultrascale+ MPSoC devices, Feb. 15, 2021, [Retrieved on Sep. 20, 2024]. Retrieved from the internet: <URL: https://cds.cern.ch/record/2763095/files/CERN-THESIS-2021-031.pdf> 111 Pages (1-111) (Year : 2021).*

*Primary Examiner* — Anibal Rivera
(74) *Attorney, Agent, or Firm* — Sand, Sebolt & Wernow LPA; Gary McFaline

(57) ABSTRACT

Flash peripheral device may include a kernel in logical communication with a bootloader where the kernel, when initialized, is adapted to upload in at least one hardware controller via the bootloader. Flash peripheral device may also include at least one firmware protocol in logical communication with the kernel and configured to initialize at least one hardware driver of the at least one hardware controller. Flash peripheral device may also include an operation application in logical communication with the kernel and provided with a legacy set of instructions and at least one updated set of instructions. The operation application executes and runs the at least one updated set of instructions when the at least one updated set of instructions is flashed to the operation application or executes and runs the legacy set of instructions when the at least one updated set of instructions fails to be flashed to the operation application.

12 Claims, 3 Drawing Sheets

(56) References Cited

U.S. PATENT DOCUMENTS

| | | | |
|---|---|---|---|
| 2021/0089327 A1* | 3/2021 | Vasilik | G06F 8/65 |
| 2021/0157921 A1* | 5/2021 | Brown | G06F 21/575 |
| 2022/0116274 A1* | 4/2022 | Ye | G06F 8/654 |
| 2023/0008412 A1* | 1/2023 | Brown | G06F 11/1076 |
| 2023/0086829 A1* | 3/2023 | Giri | G06F 9/4401 |
| | | | 714/15 |

* cited by examiner

GOLDEN FLASH IMAGE

TECHNICAL FIELD

The present disclosure relates to a flash peripheral device for an embedded system.

BACKGROUND

Flash devices and on-chip flash devices are commonly used in embedded systems. These flash devices include flash frameworks or architectures that enable operators and users of embedded systems to load and "flash" new and/or updated a set of instructions and applications to the embedded systems in the field for updating legacy or outdated protocols and applications to the embedded systems. In one instance, flash devices and on-chip flash devices may be commonly embedded in sequencers of countermeasure warfare systems provided on military platforms. Generally, these conventional flash devices are used to flash new and updated set of instructions and applications for various types of military countermeasure warfare systems on various types of platform, including aircrafts, vessels, and ground vehicles that are manned or unmanned.

Commonly, however, these conventional flash architectures provided in sequencers of countermeasure warfare systems have issues and vulnerabilities during flash operation. For example, a new and updated set of instructions may be unsuccessfully flashed to a conventional flash architecture of a conventional sequencer if the flash device or the sequencer loses power at any point during the flash operation. In another example, a new and updated set of instructions may also be unsuccessfully flashed to a conventional flash architecture of a conventional sequencer if the flash device or the sequencer generates an error at any point during the flash operation. If the new and updated set of instructions is unsuccessfully flashed to the sequencer, the embedded system of the sequencer is unusable and "bricked" for military operation.

To solve these errors, the embedded system of the sequencer must be reset by another operator or user remote from the field (e.g., a technician or engineer) due to the operator in the field being unable to interface with the embedded system. As such, the current solution creates a longer down time in fixing the embedded system, which inevitability causes military mission delays for these affected platforms.

SUMMARY

In one aspect, an exemplary embodiment of the present disclosure may provide a flash peripheral device for an embedded system. The flash peripheral device may include a kernel in logical communication with a bootloader, the kernel, when initialized, is adapted to upload in at least one hardware controller via the bootloader. The flash peripheral device may also include at least one firmware protocol in logical communication with the kernel and configured to initialize at least one hardware driver of the at least one hardware controller. The flash peripheral device may also include an operation application in logical communication with the kernel and provided with a legacy set of instructions and at least one updated set of instructions. In one instance, when the at least one updated set of instructions is flashed to the operation application, the operation application is configured to execute and run the at least one updated set of instructions. In another instance, when the at least one updated set of instructions fails to be flashed to the operation application, the operation application is configured to execute and run the legacy set of instructions.

This exemplary embodiment or another exemplary embodiment may further include that when the at least one updated set of instructions fails to be flashed to the operation application, the operation application is configured to enable at least another flash operation for flashing the at least one updated set of instructions to the operation application. This exemplary embodiment or another exemplary embodiment may further include that the operation application comprises a master flash image in logical communication with the kernel; an agent flash image in logical communication with the kernel and the master flash image; and at least one checksum element provided with one or both of the master flash image and the agent flash image and is in logical communication with the kernel; wherein the master flash image is configured to support the legacy set of instructions; wherein the agent flash image is configured to receive and support the at least one updated set of instructions. This exemplary embodiment or another exemplary embodiment may further include that the at least one checksum element comprises: a first checksum code provided with the updated set of instructions subsequent to flashing the updated set of instructions to the agent flash image; wherein when the kernel calculates a second checksum code that matches the first checksum code, the operation application is configured to execute and run the at least one updated set of instructions. This exemplary embodiment or another exemplary embodiment may further include that the at least one checksum element comprises: a first checksum code provided with the updated set of instructions subsequent to flashing the updated set of instructions to the agent flash image; wherein when the kernel calculates a second checksum code that fails to match the first checksum code, the operation application is configured to support and run the legacy set of instructions until the first checksum code and the second checksum code match one another such that the operation application is configured to execute and run the at least one updated set of instructions. This exemplary embodiment or another exemplary embodiment may further include that the at least one checksum element comprises: a first checksum element provided with the agent flash image; and a second checksum element provided with the master flash image; wherein each of the first checksum element and the second checksum element is configured to detect the updated set of instructions is uploaded to the agent flash image. This exemplary embodiment or another exemplary embodiment may further include a first checksum code created by the first checksum element and provided with the at least one updated set of instructions subsequent to uploading the updated set of instructions to the agent flash image; wherein when the kernel calculates a second checksum code that matches the first checksum code, the operation application is configured to execute and run the at least one updated set of instructions. This exemplary embodiment or another exemplary embodiment may further include a first checksum code created by the first checksum element and provided with the at least one updated set of instructions subsequent to uploading the updated set of instructions to the agent flash image; wherein when the kernel calculates a second checksum code that fails to match the first checksum code, the operation application is configured to execute and run the legacy set of instructions until the first checksum code and the second checksum code match one another.

In another aspect, an exemplary embodiment of the present disclosure may provide a method. The method may comprise steps of: producing a flash framework of a flash device of an embedded system; effecting a boot instruction to be loaded into a bootloader of the flash framework; effecting at least one dynamic random access memory (DRAM) device to be initialized, via the bootloader, of the embedded system; effecting at least one hardware controller to be initialized, via the bootloader, of the embedded system; effecting a kernel of the flash framework to be loaded, via the bootloader, into at least one DRAM device; effecting at least one firmware protocol to be instructed, via the kernel, to initiate at least one driver of the at least one hardware controller; effecting an operation application to be initialized, via the kernel, of the flash framework; effecting the at least one updated set of instructions to be flashed to the operation application for at least one flash operation until the operation application is provided on the operation application; and eliminating a need for a user to obtain a second flash device if the at least one updated set of instructions fails to be flashed to the operation application of the flash device.

This exemplary embodiment or another exemplary embodiment may further include that the step of flashing the at least one updated set of instructions to the operation application for the at least one flash operation until the operation application is provided on the operation application further includes that when the at least one updated set of instructions is flashed to the operation application, the operation application is configured to execute and run the at least one updated set of instructions. This exemplary embodiment or another exemplary embodiment may further include that the step of flashing the at least one updated set of instructions to the operation application for the at least one flash operation until the operation application is provided on the operation application further includes that when the at least one updated set of instructions fails to be flashed to the operation application, the operation application is configured to execute and run a legacy set of instructions. This exemplary embodiment or another exemplary embodiment may further include that the step of flashing the at least one updated set of instructions to the operation application for the at least one flash operation until the operation application is provided on the operation application further includes that when the at least one updated set of instructions fails to be flashed to the operation application, the operation application is configured to enable at least another flash operation for flashing the at least one updated set of instructions to the operation application. This exemplary embodiment or another exemplary embodiment may further include that the step of initializing the operation application, via the kernel, of the flash framework further comprises: initializing a master flash image of the operation application, via the kernel, wherein the master flash image is configured to support a legacy set of instructions; and initializing an agent flash image of the operation application, via the kernel, wherein the agent flash image is configured to receive and support the at least one updated set of instructions. This exemplary embodiment or another exemplary embodiment may further include steps of initializing at least one checksum element, via the kernel, that is provided with one or both of the master flash image and the agent flash image; and detecting the at least one updated set of instructions is one of flashed to the agent flash image and failed to flash to the agent flash image. This exemplary embodiment or another exemplary embodiment may further include steps of calculating a first checksum code, via the operation application, for the at least one updated set of instructions subsequent to flashing the updated set of instructions to the agent flash image; calculating a second checksum code, via the kernel, from the at least one updated set of instructions; and supporting the at least one updated set of instructions when the first checksum code and the second checksum code match one another. This exemplary embodiment or another exemplary embodiment may further include steps of calculating a first checksum code, via the operation application, for the at least one updated set of instructions subsequent to flashing the updated set of instructions to the agent flash image; and calculating a second checksum code, via the kernel, from the at least one updated set of instructions; wherein when the first checksum code and the second checksum code are different, the operation application is configured to execute and run the legacy set of instructions until the first checksum code and the second checksum code match one another such that the operation application is configured to execute and run the at least one updated set of instructions.

In yet another aspect, an exemplary embodiment of the present disclosure may provide an operational application of a flash peripheral device. The operational application may include a master flash image in logical communication with a kernel of the flash peripheral device and configured to support a legacy set of instructions. The operational application may also include an agent flash image in logical communication with the kernel and the master flash image and configured to receive and support the at least one updated set of instructions. The operational application may also include a first checksum code provided with the updated set of instructions subsequent to flashing the updated set of instructions to the agent flash image.

This exemplary embodiment or another exemplary embodiment may further include that when the kernel calculates a second checksum code that matches the first checksum code, the operation application is configured to execute and run the at least one updated set of instructions. This exemplary embodiment or another exemplary embodiment may further include that when the kernel calculates a second checksum code that fails to match the first checksum code, the operation application is configured to execute and run the legacy set of instructions until the first checksum code and the second checksum code match one another such that the operation application is configured to execute and run the at least one updated set of instructions.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
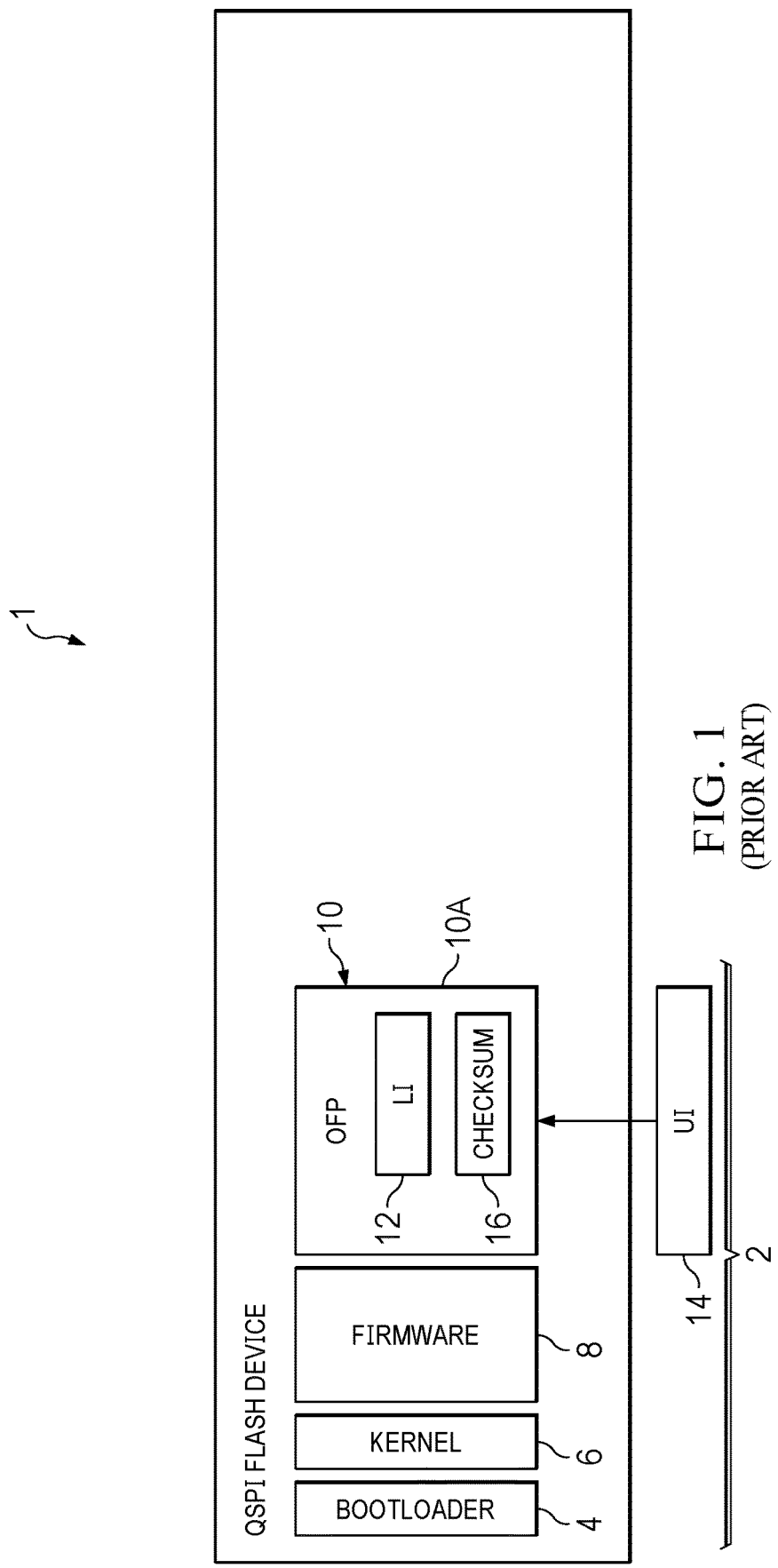
FIG. 1 (FIG. 1) is a diagrammatic view of a PRIOR ART flash device of a legacy embedded system.

FIG. 1 illustrates a PRIOR ART flash device or on-chip flash device generally referred to as 1. As illustrated herein, PRIOR ART flash device 1 is a conventional, quad-serial peripheral interface (or QSPI) legacy flash device that is provided with a legacy ALE-47 sequencer in an electronic countermeasure defense system. As described in more detail below, PRIOR ART flash device 1 includes a PRIOR ART flash architecture or framework 2 that enables operators in the field to update and/or flash a new or updated instructions or software code to PRIOR ART flash device 1 that may be stored in at least one non-transitory computer readable storage medium provided with PRIOR ART flash device 1. As also described in more detail below, PRIOR ART flash framework 2 of PRIOR ART flash device 1 is vulnerable to ceasing operation or "bricking" if a new or updated set of instructions is disrupted or interrupted during a flashing operation.

As best seen in FIG. 1, PRIOR ART flash framework 2 includes at least one bootloader generally referred to as 4. The at least one bootloader 4 is a first state bootloader that is configured to load a boot ROM or bootROM for initiating and/or booting the PRIOR ART flash framework 2. In the illustrated embodiment, the at least one bootloader 4 is configured to load a Zynq bootROM for initiating and/or booting the PRIOR ART flash framework 2. In another exemplary embodiment, the at least one bootloader 4 is configured to load any suitable and commercially available bootROM for initiating and/or booting the PRIOR ART flash framework 2. Upon loading the bootROM into the at least one bootloader 4, the at least one bootloader 4 then initiates at least one dynamic random access memory device (or DRAM) and other hardware controllers provided in the legacy sequencer.

Still referring to FIG. 1, PRIOR ART flash framework 2 also includes a kernel or non-transitory computer readable storage medium, which is generally referred to as 6, that is in logical communication with the at least one bootloader of the PRIOR ART flash framework 2. During a booting operation, the at least one bootloader 4 is configured to load the kernel 6 into the at least one DRAM. Generally, the kernel 6 is configured to commanded and/or program a bitstream or at least one firmware component 8 to at least one field programmable gate array (or FPGA) or integrated circuit provided in the legacy sequencer. Upon this command, the kernel 6 may then parse at least one device tree or data structure that describes the at least one hardware components provided in the legacy sequencer in order for the kernel 6 to use and manage the at least one hardware component. Upon this parsing, the kernel 6 is then enabled to initialize at least one hardware driver of the at least one hardware controller initialized by the at least one bootloader 4.

Still referring to FIG. 1, PRIOR ART flash framework 2 also includes an operation application which is generally referred to as 10, that is in logical communication with the kernel 6. Upon a booting operation, the kernel 6 is configured to load and/or initiate the operation application 10. The operation application 10 may be any suitable operation application or similar application of the like that is configured to be executed by the PRIOR ART flash framework 2 of the PRIOR ART flash device 1 and the legacy sequencer for specific military operations. In one instance, an operation application may be an operational flight program (OFP) application that is utilized for countermeasure defense systems provided on military aircrafts. In another instance, an operation application may be any suitable operation application that is utilized in countermeasure defense systems and other suitable systems of the like. As best seen in FIG. 1, the operation application 10 includes a single flash image 10A. Prior to field use and/or military operation, the flash image 10A is loaded with a first or legacy set of instructions 12 that is flashed onto the PRIOR ART flash framework 2 of the legacy sequencer having a legacy checksum. The flash image 10A is also configured to be flashed with a second or updated set of instructions 14 that updates the legacy set of instructions 12 previously loaded to the flash image 10A, which is described in more detail below.

The operation application 10 may also include a checksum element 16 that is appended with and in logical communication with the flash image 10A. In operation, the operation application 10 is configured to generate a new checksum code for the checksum 16 when the updated set of instructions 14 is uploaded to and flashed to the flash image 10A. Upon a loading operation, the updated set of instructions 14 overwrites the legacy set of instructions 12 originally provided in the operation application. During this loading operation, the operation application 10 then calculates a checksum code for the checksum element 16 for the updated set of instructions 14 prior to being flashed to the flash image 10A in the field. Once flashed, the checksum code of the updated set of instructions 14 appends to the flash image 10A and replaces the prior checksum 16 of the legacy set of instructions 12 to the flash image 10A with the new checksum 16 of the updated set of instructions 14. Upon the completion of a flash operation, the kernel 6 is then rebooted upon the completion of a flash operation to determine if the updated set of instructions 14 was successfully and completely uploaded to the PRIOR ART flash device 1 and the legacy sequencer, which is described in more detail below.

In the field, an operator may flash the operation application 10, specifically the flash image 10A, with the updated set of instructions 14 that updates and upgrades the legacy set of instructions 12 previously loaded to the flash image 10A. With regards to PRIOR ART flash device 1, PRIOR ART flash device 1 must maintain power throughout an entire flash operation when the operator is attempting to flash the updated set of instructions 14 to the operation application 10 of the PRIOR ART flash device 1. In one instance, the updated set of instructions 14 is successful uploaded to the flash image 10A and is used by the legacy sequencer for military operations when the power of the legacy sequencer is maintained throughout an entire flash operation. In this instance, the updated set of instructions 14 is successfully uploaded to the flash image 10A when the kernel 6 calculates a checksum code, subsequent to a reboot operation, and the checksum code matches with the checksum 16 calculated by the operation application 10 when the updated set of instructions 14 was loaded and flashed to the flash image 10A. In another instance, the updated set of instructions 14 is unsuccessful uploaded to the flash image 10A and cannot be used by the legacy sequencer for military operations if the power of the legacy sequencer is lost or interrupted at any time period of a flash operation or an error occurs at any time period of a flash operation. In this instance, updated set of instructions 14 is unsuccessfully uploaded to the flash image 10A when the kernel 6 calculates a checksum code, subsequent to a reboot operation, that fails to match with the checksum 16 calculated by the operation application 10 when the updated set of instructions 14 was loaded and flashed to the flash image 10A. In this same instance, the devices and components provided in the legacy sequencer, including the PRIOR ART flash device 1, are effectively unusable and/or is "bricked" due to the checksum codes not matching with one another. Due to the architecture of the operation application 10 designed in PRIOR ART flash framework 2, the operator is unable to correct and/or fix in the field since the operation application 10 relies upon a single flash image 10A. In other words, the single flash image 10A cannot be accessed once the single flash image 10A is corrupted due to an incomplete flash operation or creation of an error during the flash operation. As such, the use of the single flash image 10A creates potential issues of malfunction and usability if a flashing operation of an updated set of instructions is interrupted at any time during said flashing operation.

It should be understood that the PRIOR ART flash framework 2 is not accessible by the operators when flashing updated sets of instructions into the PRIOR ART flash framework 2. Rather, the PRIOR ART flash framework 2 is only accessible to specific individuals and/or entities (e.g., engineering/factory access only) for manipulating, overwriting, and/or design the PRIOR ART flash framework 2. It should also be understood that the PRIOR ART flash framework 2 may only use a portion of the overall memory and/or logical space in the PRIOR ART flash device 1.

Figure 2:
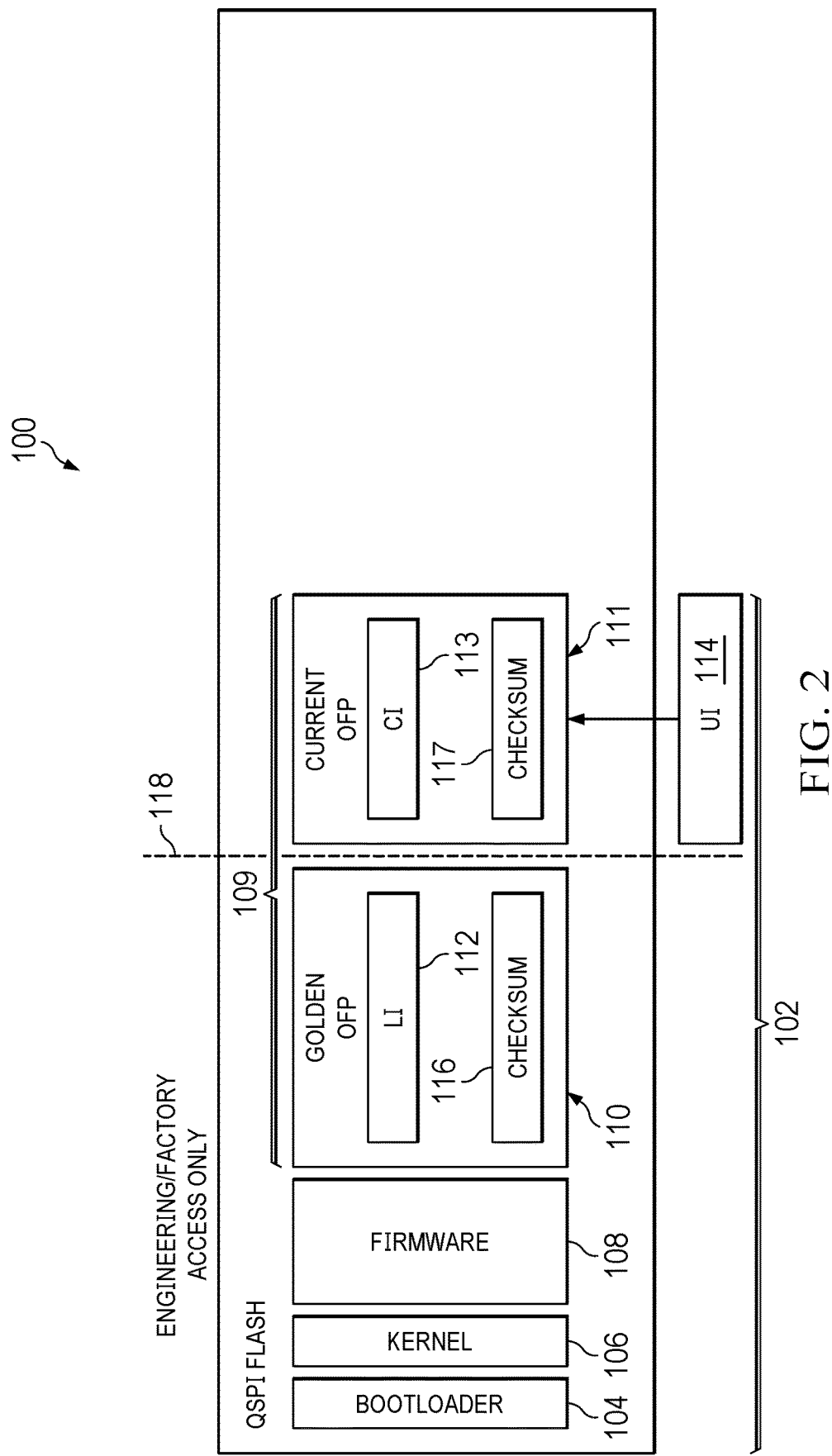
FIG. 2 (FIG. 2) is a diagrammatic view of a novel flash device provided of an embedded system.

FIG. 2 illustrates a new flash device or on-chip flash device generally referred to as 100. As illustrated herein, flash device 100 is a new quad-serial peripheral interface (or QSPI) flash device that may be operable with any suitable countermeasure sequencer commercially available. In one example, the flash device 100 is operable with the Smart D2/Common Carriage Sequencer manufactured by BAE Systems. In another example, the flash device 100 may be any suitable serial peripheral interface (SPI) that is configured to operate with a commercially available sequencer for a countermeasure defense system. As described in more detail below, flash device 100 includes a flash framework 102 that enables operators in the field to continuously update and/or flash new or updated instructions or software codes to flash device 100 that may be stored in at least one non-transitory computer readable storage medium provided with flash device 100. As also described in more detail below, the architecture of flash framework 102 is invulnerable to ceasing operation or "bricking" when new or updated set of instructions are interrupted or corrupted during a flashing operation.

As best seen in FIG. 2, flash framework 102 includes at least one bootloader generally referred to as 104. The at least one bootloader 104 is a first state bootloader that is configured to load a boot ROM or bootROM for initiating and/or booting flash framework 102. In the illustrated embodiment, the at least one bootloader 104 is configured to load a Zynq bootROM for initiating and/or booting flash framework 102. In another exemplary embodiment, the at least one bootloader 104 is configured to load any suitable and commercially available bootROM for initiating and/or booting flash framework 102. Upon loading the bootROM into the at least one bootloader 104, the at least one bootloader 104 then initiates at least one dynamic random access memory device (or DRAM) and other hardware controllers provided in the sequencer. While not illustrated herein, the at least one bootloader 104 may be partitioned into at least two partitions where each partition is in logical communication with the master flash image and the agent flash image for different operation or mission needs.

Still referring to FIG. 2, flash framework 102 also includes a kernel or non-transitory computer readable storage medium, which is generally referred to as 106, that is in logical communication with the at least one bootloader of flash framework 102. During a booting operation, the at least one bootloader 104 is configured to load the kernel 106 into the at least one DRAM. Generally, the kernel 106 is configured to commanded and/or program a bitstream or at least one firmware component 108 to at least one field programmable gate array (or FPGA) or integrated circuit provided in the sequencer. Upon this command, the kernel 106 may then parse at least one device tree or data structure that describes the at least one hardware components provided in the sequencer in order for the kernel 106 to use and manage the at least one hardware component. Upon this parsing, the kernel 106 is then enabled to initialize at least one hardware driver of the at least one hardware controller initialized by the at least one bootloader 104.

Still referring to FIG. 2, flash framework 102 also includes an operation application which is generally referred to as 110, that is in logical communication with the kernel 106. Upon a booting operation, the kernel 106 is configured to load and/or initiate the operation application 109. The operation application 109 may be any suitable operation application or similar application of the like that is configured to be executed by flash framework 102 of flash device 100 and the sequencer for specific military operations. In one instance, an operation application may be an operational flight program (OFP) application that is utilized for countermeasure defense systems provided on military aircrafts. In another instance, an operation application may be any suitable operation application that is utilized in countermeasure defense systems and other suitable systems of the like.

As best seen in FIG. 2, the operation application 109 includes a pair of flash images 110, 111 for utilizing one of a first or legacy set of instructions 112 or a second or updated set of instructions 114 that is newer generation than the legacy set of instructions 112. For demonstrative purposes, the flash images 110 of the operation application 109 are shown as separate entities for illustrative purpose; it should be understood that the flash images 110 of the operation application 109 act as a single entity during flashing operations. Prior to field use and/or military operation, a master or golden flash image 110 and an agent or current flash image 110 may be loaded with the legacy set of instructions 112 that is flashed onto the sequencer. Additionally, as shown in FIG. 2, the agent flash image 111 may have been flashed with a current set of instructions 113 that may differ from the legacy set of instructions 112 (i.e., the current set of instructions 113 is a newer generation of instructions than the legacy set of instructions 112). Additionally, the agent flash image 111 is configured to be flashed with the updated set of instructions 114 that upgrades and/or updates the legacy set of instructions 112 previously loaded to the agent flash image 111 or the current set of instructions 113 previously loaded and flashed to the agent flash image 111, which is described in more detail below. Based on this architecture, the operation application 109 is configured to utilize and retain the legacy set of instructions 112, via the master flash image 110, while the agent flash image 111 is configured to utilize the updated set of instructions 114 that upgrades and/or updates the legacy set of instructions 112. Such use of either the legacy set of instructions 112 and/or the updated set of instructions 114 via the master flash image 110 and the agent flash image 111 is described in more detail below.

It should be understood that the legacy set of instructions 112 and the updated set of instructions 114 may be designed to be loaded into one or both of the master flash image 110 and the agent flash image 111. In one instance, the legacy set of instructions 112 may be designed to be flashed to the master flash image 110 and the agent flash image 111. In another instance, the updated set of instructions 114 may be designed to be flashed to the agent flash image 111 only while the master flash image 110 retains the legacy set of instructions 112.

The operation application 109 may also include at least one checksum element or function 116 that is configured with one or both of the master flash image 110 and the agent flash image 111. Prior to field use, the master flash image 110 includes a first checksum 116 that is calculated by the operation application 109 and is flashed to the master flash image 110 (see FIG. 2). Additionally, the agent flash image 111 includes a second checksum 117 that is calculated by the operation application 109 and is flashed to the agent flash image 111 (see FIG. 2). During field use, the operation application 109 is also configured to generate the second checksum 117 when the updated set of instructions 114 is uploaded to and flashed to the agent flash image 111. Upon a loading operation, the updated set of instructions 114 overwrites the current set of instructions 113 currently loaded and flashed to the agent flash image 111. During this loading operation, the operation application 109 then recalculates a checksum code for the checksum element 116 for the updated set of instructions 114 prior to being flashed to the flash image 110 in the field. Once flashed, the checksum 117 of the updated set of instructions 114 is then appended to the agent flash image 111 and replaces the checksum 117 that was calculated for the current set of instructions 113. Upon the completion of a flash operation, the kernel 106 is then rebooted upon the completion of a flash operation to determine if the updated set of instructions 114 was successfully and completely uploaded to the flash framework 102 of the flash device 100 with the sequencer, which is described in more detail below.

In the field, an operator may flash the operation application 109, specifically the agent flash image 111, with the updated set of instructions 114 that upgrades and/or updates the current set of instructions 113 previously loaded to the agent flash image 111. With regards to the flash device 100, the flash device 100 must maintain power throughout an entire flash operation when the operator is attempting to flash the updated set of instructions 114 to the operation application 109 of the flash framework 102. In other words, the flash framework 102 must be operating and/or running until the updated set of instructions 114 is fully loaded and flashed to the agent flash image 111. In one instance, the updated set of instructions 114 is successful uploaded to the agent flash image 111 and is used by the sequencer for military operations when the power of the sequencer is maintained throughout an entire flash operation. In this instance, the updated set of instructions 114 is successfully uploaded to the agent flash image 111 when the kernel 106 reads the agent flash image 111 and calculates a checksum code, subsequent to a reboot operation, that matches with the checksum 117 calculated by the operation application 109 when the updated set of instructions 114 was loaded and flashed to the agent flash image 111.

In another instance, the updated set of instructions 114 is unsuccessful uploaded to the agent flash image 111 and cannot be used by the sequencer for military operations if the power of the sequencer is lost or interrupted at any time period of a flash operation or a corruption error occurs at any time period of a flash operation. In this instance, the updated set of instructions 114 is unsuccessfully uploaded to the agent flash image 111 when the kernel 106 reads the agent flash image 111 and calculates a checksum code, subsequent to a reboot operation, that fails to match with the checksum 117 of the agent flash image 111 calculated by the operation application 109 when the updated set of instructions 114 was loaded and flashed to the agent flash image 111. When the updated set of instructions 114 is unsuccessful uploaded to the agent flash image 111, the kernel 106 then reverts to the master flash image 110 that includes the legacy set of instructions 112. As such, the kernel 106 is then configured to execute the legacy set of instructions 112 of the operation application 109 by initiating the master flash image 110 originally flashed to the operation application 109. Upon this execution, the kernel 106 then calculates a checksum from the master flash image 110 to determine the checksum 116 of the master flash image 110 matches with the checksum calculated by the kernel 106. Once the kernel 106 determines the checksum matches with the checksum 116, the legacy set of instructions 112 is then reinitiated by the master flash image 110 and re-enables the operator to reflash or reload the updated set of instructions 114 to the flash device 100 for at least another flash operation. With such configuration, the kernel 106 may continuously initiate the master flash image 110 originally flashed to the operation application 109 to reinitiate the legacy set of instructions 112 until the updated set of instructions 114 is successfully uploaded to the agent flash image 111 per determination made by the kernel 106.

Such inclusion of the master flash image 110 and the agent flash image 111 of the operation application 109 into flash framework 102 is considered advantageous at least because the architecture of the operation application 109 enables continuous reflashing operations for an updated set of instructions when an original flashing operation is interrupted due to sequencer power failure or the updated set of instructions incurs an error due to corruption during the original flashing operation. Such communication between the kernel 106 and the pair of flash images 110 enables the kernel 106 to continuously monitor and reinitiate a legacy set of instructions to create continuous reflashing operations for the operator until an updated set of instructions is successfully uploaded to the agent flash image 111.

Such continuous reflashing operations created between the kernel 106 and the operation application 109 is also considered advantageous at least because the continuous reflashing operations also enables the flash device 100 and the sequencer to be invulnerable to "bricking" or usability issues as compared to PRIOR ART flash device 1 and legacy sequencer. In this case, logical communication between the kernel 106 and the operation application 109 of the flash framework 102 provides the operator with continuous reflashing operations in the field to successfully uploaded an updated set of instructions to the agent flash image 111. Such continuous reflashing operations eliminates the processes of factory repair and/or overwriting as compared to PRIOR ART flash device 1 and legacy sequencer.

It should be understood that the flash framework 102 includes at least one access barrier that prevents accessibility or limits accessibility to certain personal and/or individuals; the at least one access barrier is denoted by a dashed line labeled 118 in FIG. 2. In one instance, a first section of the flash framework 102 is only accessible to specific individuals and/or entities (e.g., engineering/factory access only) for manipulating, overwriting, and/or designing the flash framework 102 while not in the field. In this instance, the components before and/or left of the access barrier 118 (e.g., bootloader 104, kernel 106, firmware component 108, and the master flash image 110) are only accessible to specific individuals and/or entities (e.g., engineering/factory access only) for manipulating, overwriting, and/or designing the flash framework 102 while not in the field. In another instance, a second section of the flash framework 102 is accessible to the specific individuals and/or entities (e.g., engineering/factory access only) for manipulating, overwriting, and/or design the flash framework 102 along with operators flashing the flash framework 102 in the field. In this instance, the components after and/or right of the access barrier 118 (e.g., the agent flash image 111) are accessible by specific individuals and/or entities and accessible by the operators in the field when flashing updated sets of instructions into the flash framework 102.

Figure 3:
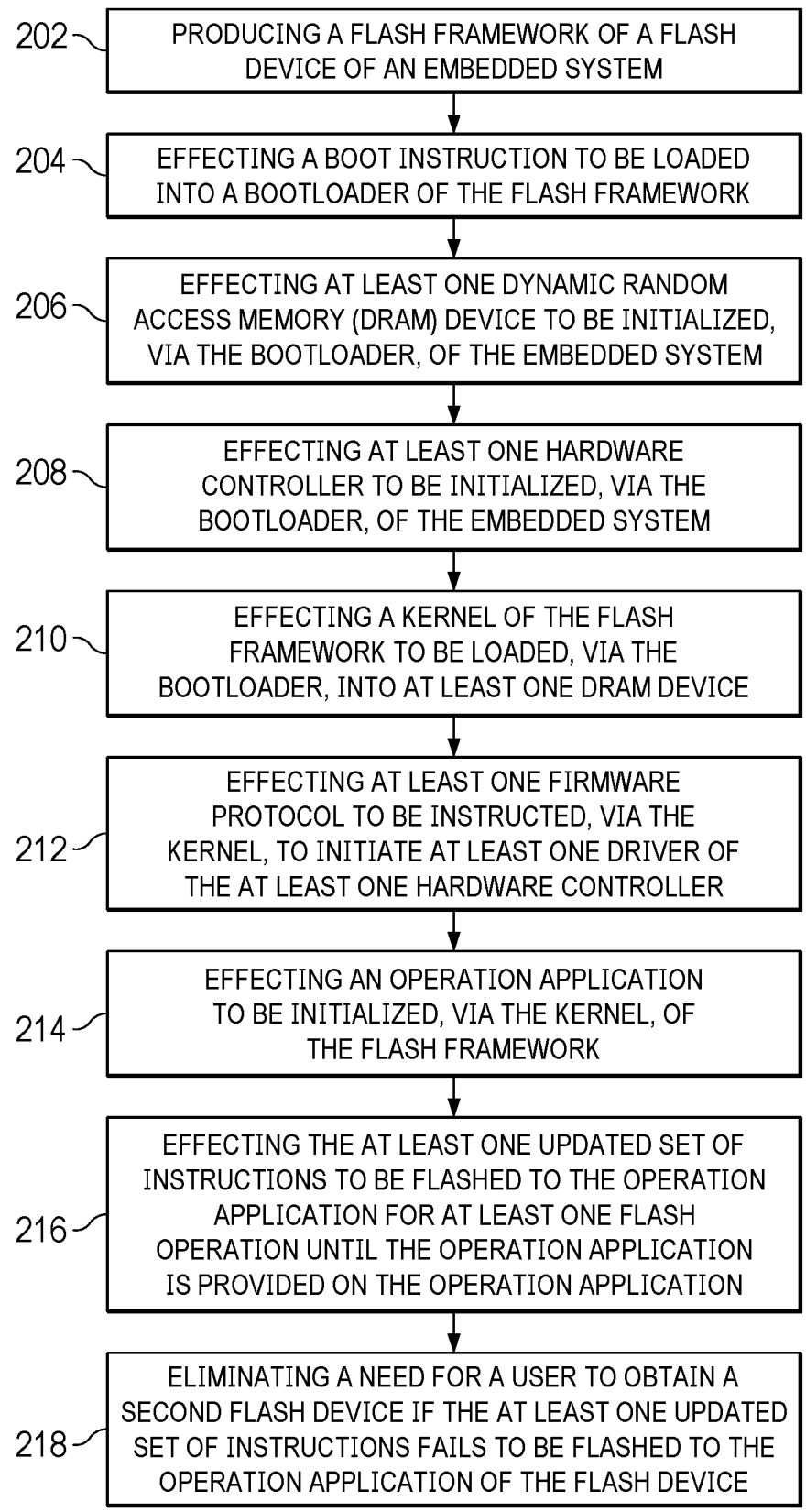
FIG. 3 (FIG. 3) is an exemplary method flowchart.

FIG. 3 illustrates an exemplary method 200. An initial step 202 of method 200 may include producing a flash framework of a flash device of an embedded system. Another step 204 of method 200 may include effecting a boot instruction to be loaded into a bootloader of the flash framework. Another step 206 of method 200 may include effecting at least one dynamic random access memory (DRAM) device to be initialized, via the bootloader, of the embedded system. Another step 208 of method 200 may include effecting at least one hardware controller to be initialized, via the bootloader, of the embedded system. Another step 210 of method 200 may include effecting a kernel of the flash framework to be loaded, via the bootloader, into at least one DRAM device. Another step 212 of method 200 may include effecting at least one firmware protocol to be instructed, via the kernel, to initiate at least one driver of the at least one hardware controller. Another step 214 of method 200 may include effecting an operation application to be initialized, via the kernel, of the flash framework. Another step 216 of method 200 may include effecting the at least one updated set of instructions to be flashed to the operation application for at least one flash operation until the operation application is provided on the operation application. Another step 218 of method 200 may include eliminating a need for a user to obtain a second flash device if the at least one updated set of instructions fails to be flashed to the operation application of the flash device.

In other exemplary embodiments, method 200 may include optional and/or additional steps. An optional step may include that the step of flashing the at least one updated set of instructions to the operation application for the at least one flash operation until the operation application is provided on the operation application further includes that when the at least one updated set of instructions is flashed to the operation application, the operation application is configured to execute and run the at least one updated set of instructions. Another optional step may include that the step of flashing the at least one updated set of instructions to the operation application for the at least one flash operation until the operation application is provided on the operation application further includes that when the at least one updated set of instructions fails to be flashed to the operation application, the operation application is configured to execute and run a legacy set of instructions. Another optional step may include that the step of flashing the at least one updated set of instructions to the operation application for the at least one flash operation until the operation application is provided on the operation application further includes that when the at least one updated set of instructions fails to be flashed to the operation application, the operation application is configured to enable at least another flash operation for flashing the at least one updated set of instructions to the operation application. Optional steps may include that the step of initializing the operation application, via the kernel, of the flash framework further comprises: initializing a master flash image of the operation application, via the kernel, wherein the master flash image is configured to support a legacy set of instructions; and initializing an agent flash image of the operation application, via the kernel, wherein the agent flash image is configured to receive and support the at least one updated set of instructions. Optionals step may include initializing at least one checksum element, via the kernel, that is provided with one or both of the master flash image and the agent flash image; and detecting the at least one updated set of instructions is one of flashed to the agent flash image and failed to flash to the agent flash image. Optional steps may include calculating a first checksum code, via the operation application, for the at least one updated set of instructions subsequent to flashing the updated set of instructions to the agent flash image; calculating a second checksum code, via the kernel, from the at least one updated set of instructions; and supporting the at least one updated set of instructions when the first checksum code and the second checksum code match one another. Optional steps may include calculating a first checksum code, via the operation application, for the at least one updated set of instructions subsequent to flashing the updated set of instructions to the agent flash image; and calculating a second checksum code, via the kernel, from the at least one updated set of instructions; wherein when the first checksum code and the second checksum code are different, the operation application is configured to execute and run the legacy set of instructions until the first checksum code and the second checksum code match one another such that the operation application is configured to execute and run the at least one updated set of instructions.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A flash peripheral device for an embedded system, comprising:
a kernel in logical communication with a bootloader, the kernel, when initialized, is adapted to upload in at least one hardware controller via the bootloader;
at least one firmware protocol in logical communication with the kernel and configured to initialize at least one hardware driver of the at least one hardware controller; and
an operation application in logical communication with the kernel and provided with a legacy set of instructions and at least one updated set of instructions;
wherein the operation application comprises;
a master flash image in logical communication with the kernel;
an agent flash image in logical communication with the kernel and the master flash image; and
at least one checksum element provided with both the master flash image and the agent flash image and in logical communication with the kernel;
wherein each checksum element is configured to detect the at least one updated set of instructions is uploaded to the agent flash image;
wherein when the at least one updated set of instructions is flashed to the operation application, the operation application is configured to execute and run the at least one updated set of instructions;
wherein when the at least one updated set of instructions fails to be flashed to the operation application, the operation application is configured to execute and run the legacy set of instructions.

2. The flash peripheral device of claim 1, wherein when the at least one updated set of instructions fails to be flashed to the operation application, the operation application is configured to enable at least another flash operation for flashing the at least one updated set of instructions to the operation application.

3. The flash peripheral device of claim 1, wherein the at least one checksum element comprises:
a first checksum code provided with the at least one updated set of instructions subsequent to flashing the at least one updated set of instructions to the agent flash image;
wherein when the kernel calculates a second checksum code that matches the first checksum code, the operation application is configured to execute and run the at least one updated set of instructions.

4. The flash peripheral device of claim 1, wherein the at least one checksum element comprises:
a first checksum code provided with the at least one updated set of instructions subsequent to flashing the updated set of instructions to the agent flash image;
wherein when the kernel calculates a second checksum code that fails to match the first checksum code, the operation application is configured to support and run the legacy set of instructions until the first checksum code and the second checksum code match one another such that the operation application is configured to execute and run the at least one updated set of instructions.

5. The flash peripheral device of claim 1, further comprising:
a first checksum code created by the first checksum element and provided with the at least one updated set of instructions subsequent to uploading the at least one updated set of instructions to the agent flash image;
wherein when the kernel calculates a second checksum code that matches the first checksum code, the operation application is configured to execute and run the at least one updated set of instructions.

6. The flash peripheral device of claim 1, further comprising:
a first checksum code created by the first checksum element and provided with the at least one updated set of instructions subsequent to uploading the at least one updated set of instructions to the agent flash image;
wherein when the kernel calculates a second checksum code that fails to match the first checksum code, the operation application is configured to execute and run the legacy set of instructions until the first checksum code and the second checksum code match one another.

7. A method; comprising:
producing a flash framework of a flash device of an embedded system;

effecting a boot instruction to be loaded into a bootloader of the flash framework;

effecting at least one dynamic random access memory (DRAM) device to be initialized, via the bootloader, of the embedded system;

effecting at least one hardware controller to be initialized, via the bootloader, of the embedded system;

effecting a kernel of the flash framework to be loaded, via the bootloader, into at least one DRAM device;

effecting at least one firmware protocol to be instructed, via the kernel, to initiate at least one driver of the at least one hardware controller;

effecting an operation application to be initialized, via the kernel, of the flash framework;

initializing a master flash image of the operation application, via the kernel, wherein the master flash image is configured to support a legacy set of instructions;

initializing an agent flash image of the operation application, via the kernel, wherein the agent flash image is configured to receive and support the at least one updated set of instructions;

initializing at least one checksum element, via the kernel, that is provided with one or both of the master flash image and the agent flash image;

detecting the at least one updated set of instructions is one of flashed to the agent flash image and failed to flash to the agent flash image;

calculating a first checksum code, via the operation application, for the at least one updated set of instructions subsequent to flashing the updated set of instructions to the agent flash image;

calculating a second checksum code, via the kernel, from the at least one updated set of instructions;

supporting the at least one updated set of instructions when the first checksum code and the second checksum code match one another;

wherein when the first checksum code and the second checksum code are different, the operation application is configured to execute and run the legacy set of instructions until the first checksum code and the second checksum code match one another such that the operation application is configured to execute and run the at least one updated set of instructions;

effecting the at least one updated set of instructions to be flashed to the operation application for at least one flash operation until the operation application is provided on the operation application; and eliminating a need for a user to obtain a second flash device if the at least one updated set of instructions fails to be flashed to the operation application of the flash device.

8. The method of claim 7, wherein the step of flashing the at least one updated set of instructions to the operation application for the at least one flash operation until the operation application is provided on the operation application further includes that when the at least one updated set of instructions is flashed to the operation application, the operation application is configured to execute and run the at least one updated set of instructions.

9. The method of claim 7, wherein the step of flashing the at least one updated set of instructions to the operation application for the at least one flash operation until the operation application is provided on the operation application further includes that when the at least one updated set of instructions fails to be flashed to the operation application, the operation application is configured to execute and run a legacy set of instructions.

10. The method of claim 7, wherein the step of flashing the at least one updated set of instructions to the operation application for the at least one flash operation until the operation application is provided on the operation application further includes that when the at least one updated set of instructions fails to be flashed to the operation application, the operation application is configured to enable at least another flash operation for flashing the at least one updated set of instructions to the operation application.

11. An operational application embodied and executed by a flash peripheral device, the operational application comprising:

a master flash image in logical communication with a kernel of the flash peripheral device and configured to support a legacy set of instructions;

an agent flash image in logical communication with the kernel and the master flash image and configured to receive and support the at least one updated set of instructions; and a first checksum code provided with the at least one updated set of instructions subsequent to flashing the updated set of instructions to the agent flash image;

wherein when the kernel calculates a second checksum code that fails to match the first checksum code, the operational application is configured to support and run the legacy set of instructions until the first checksum code and the second checksum code match one another such that the operational application is configured to execute and run the at least one updated set of instructions.

12. The operational application of claim 11, wherein when the kernel calculates a second checksum code that fails to match the first checksum code, the operation application is configured to execute and run the legacy set of instructions until the first checksum code and the second checksum code match one another such that the operation application is configured to execute and run the at least one updated set of instructions.

* * * * *